Aug. 18, 1970   E. L. CARLEY   3,524,793
LAMINATED PLASTIC SHEET HAVING THE TRANSVERSE GAUGE BANDS
OF LAMINATED SHEET NESTED WITH RESPECT TO ONE ANOTHER
Original Filed June 28, 1965   2 Sheets-Sheet 1
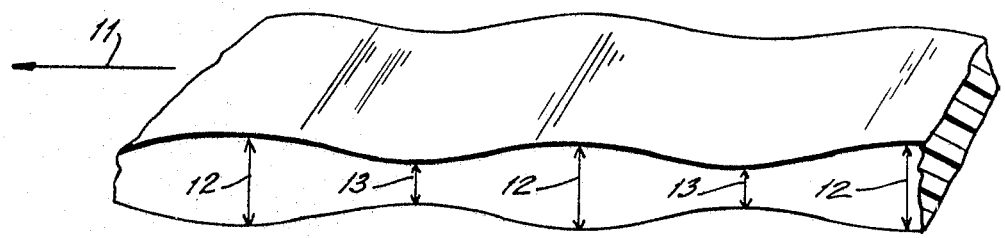
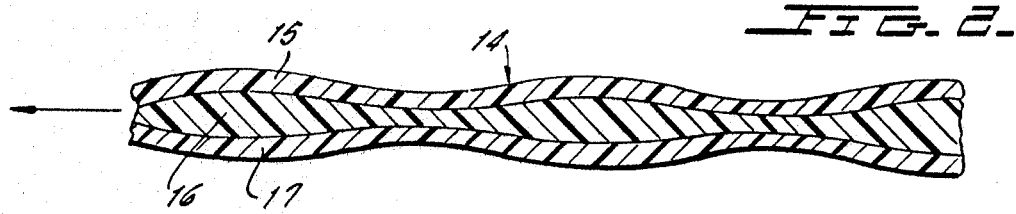
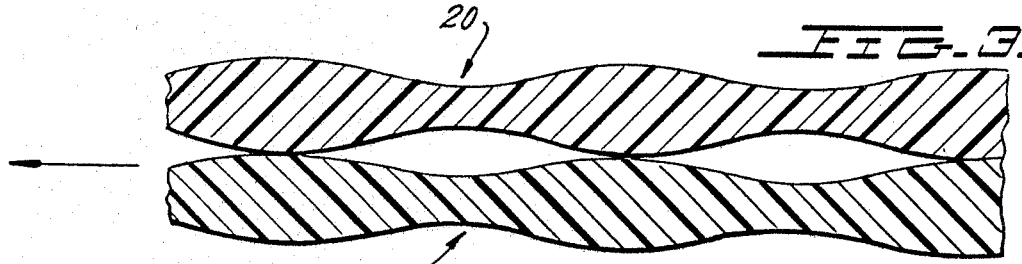
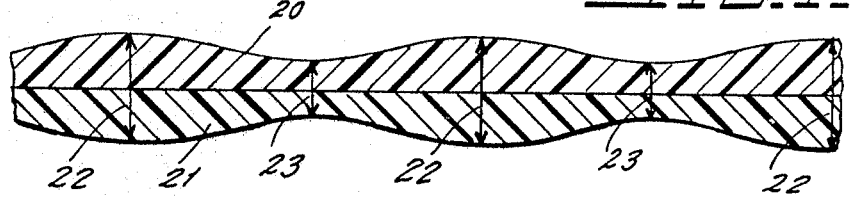
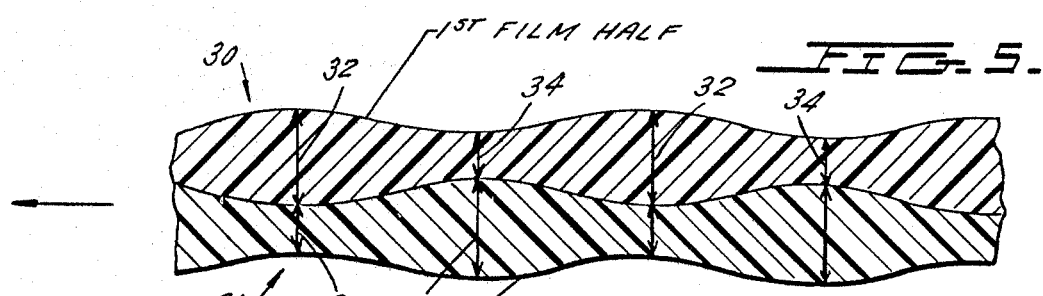
INVENTOR.
EMILE LUCILLE CARLEY
BY
Allen A. Meyer, Jr.
ATTORNEYS

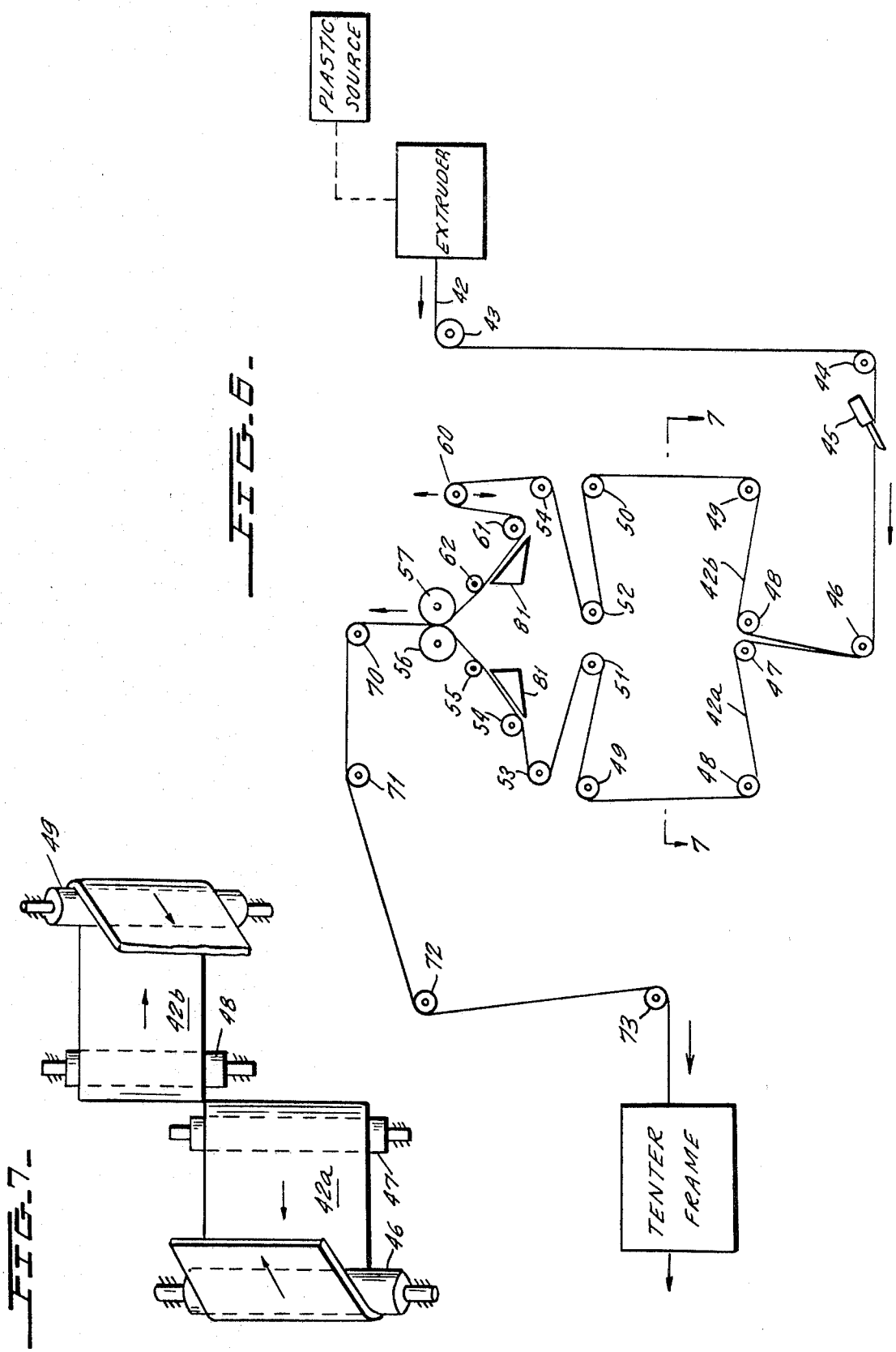

United States Patent Office 3,524,793
Patented Aug. 18, 1970

3,524,793
LAMINATED PLASTIC SHEET HAVING THE TRANSVERSE GAUGE BANDS OF LAMINATED SHEET NESTED WITH RESPECT TO ONE ANOTHER
Emilie Lucille Carley, Trumbull, Conn., assignor to National Distillers and Chemical Corporation, New York, N.Y., a corporation of Virginia
Original application June 28, 1965, Ser. No. 467,588, now Patent No. 3,416,986, dated Dec. 17, 1968. Divided and this application Dec. 26, 1967, Ser. No. 725,966
Int. Cl. B32b 3/00
U.S. Cl. 161—119
1 Claim

ABSTRACT OF THE DISCLOSURE

A laminated plastic sheet is formed of two layer of extruded plastic material, each layer having identical transverse gauge bands repeating in a cyclic pattern. The gauge bands of the two layers are longitudinally displaced and nested with respect to each other to decrease the overall thickness variation of the sheet.

---

This application is a division of copending application Ser. No. 467,588, filed June 28, 1965, in the name of Emilie L. Carley, entitled, Method and Apparatus for Laminating Thermoplastic Films, and assigned to the assignee of the present invention, now Pat. No. 3,416,986.

This invention relates to a novel method and apparatus for producing laminated thermoplastic film or sheet, and more particularly relates to a novel method and apparatus for the production of thermoplastic film or sheet wherein a first longitudinal portion of an extruded film is laid atop a second longitudinal portion with the transverse gauge bands of the two sheets displaced from one another so that they nest with one another when pressed together.

This invention is an improvement of copending application Ser. No. 324,868, filed Nov. 19, 1963, in the name of Moser, and assigned to the assignee of the present invention, now Pat. No. 3,380,868.

As described in the above noted application, it is desirable to produce a thermoplastic film of a laminated nature by extruding sheets of film, and thereafter overlaying them and then orienting them by a longitudinal or transverse stretching operation, or both, whereupon the sheets are laminated to one another.

In accordance with the present invention, this process is applicable to sheets or films of thermoplastic material which may be of polypropylene, or any other type material, including individual sheets which are themselves laminated or multilayered in accordance with the teachings of copending application Ser. No. 324,868 filed Nov. 19, 1963, in the name of Moser and assigned to the assignee of the present invention.

Moreover, and in accordance with an important feature of the invention, the transverse gauge bands which are commonly produced in extruded plastic film and sheet are displaced from one another in the two adjacent sheets so that they are nested with respect to one another, thereby to decrease the maximum deviation from the average gauge of the final laminated product.

In a preferred embodiment of the invention, this novel method is carried out by extruding a wide sheet of thermoplastic material of any desired nature and of any desired number of layers. The sheet is then cut in its middle to define two adjacent longitudinal sheets having substantially identical transverse gauge band variations. That is to say, the sheet will have periodically disposed sections of increased and decreased thickness running in a direction perpendicular to the direction of extrusion of the sheet, commonly known as transverse gauge bands. Thereafter, one of the longitudinal sheets is advanced or retarded in its position with respect to the other of the longitudinal sheets so that the transverse gauge bands of the advanced or retarded sheet will nest with respect to the similar gauge bands in the other half of the sheet. Thereafter, the two longitudinal sheets are displaced in space so that they run atop one another and through a suitable pressure means which forces them into the surface contact with the transverse gauge bands nesting with one another. This combined sheet is then passed into a suitable tenter frame or other suitable operating means for purpose of orientation by stretching in a transverse direction and/or machine direction, whereupon the sheets are further intimately laminated in accordance with the teachings of the above noted copending application Ser. No. 324,868.

Since the transverse gauge bands of the two longitudinal sheet sections have been nested with respect to one another, it will be apparent that the average variation in thickness of the sheet due to transverse gauge bands will be substantially reduced.

Moreover, it has been found that the initial combination of the two sheets in this manner eliminates, to a substantial degree, the possibility of splitting the sheet during transverse and machine direction orientation which often occurs with presently used equipment in view of the relatively wide thickness variations of the sheets presently being oriented.

Accordingly, a primary object of this invention is to produce a novel laminated plastic product having a decreased range of gauge variation.

Another object of this invention is to provide a novel method for the lamination of two plastic sheets or films which reduces the possibility of splitting of the sheet during orientation.

Yet another object of this invention is to reduce the effect of transverse gauge bands in extruded thermoplastic sheets and films.

Another object of this invention is to provide a novel method and apparatus for the production of thermoplastic film having improved strength and optical properties.

These and other objects of this invention will become apparent from the following description when taken in connection with the drawings, in which:

FIG. 1 schematically illustrates, in perspective view transverse gauge bands in an extruded plastic film or sheet with exaggerated thickness.

FIG. 2 is a cross-sectional view of a sheet such as the sheet of FIG. 1 to illustrate that the sheet of FIG. 1 may be either a single layer structure or a three-layer structure before laminating.

FIG. 3 illustrates the prior art method of laminating as disclosed in application Ser. No. 324,868, wherein two sheets have been laid atop one another with their transverse gauge bands in alignment with one another where the individual sheets of FIG. 3 can be of the single layer type or of the multilayer type, as shown in FIG. 2.

FIG. 4 illustrates the sheet of FIG. 3 after laminating, and depicts the exaggerated gauge band variations after lamination.

FIG. 5 illustrates the laminated product when laminated in accordance with the invention wherein the sheets being laminated are displaced from one another so that their gauge bands nest with respect to one another.

FIG. 6 schematically illustrates the extrusion of a sheet of film, the subsequent slitting of the film, the displacement of the various sheets with respect to one another and their subsequent lamination in the displaced positions.

FIG. 7 is across-sectional view of FIG. 6 taken across the line 7—7 in FIG. 6, and illustrates the roller construction for displacing the two halves of the film toward one another so that they can be overlaid upon one another prior to the laminating step.

Referring first to FIG. 1, I have illustrated therein a typical film or sheet of thermoplastic material 10 which is elongated and moves in the direction of the arrows 11 during the extrusion thereof from any standard extrusion die.

It is well known in the art that such sheets or films which may have an actual average thickness of from, for example, 1 to 20 mils will exhibit periodic thickness variation along the length of the film known as transverse gauge bands. Thus, in FIG. 1, a thickened section identified by arrows 12 is a region extending across the width of film 10 known as a transverse gauge band. Correspondingly, the increased thickness sections are followed by decreased thickness sections identified by arrows 13, whereupon the sheet will exhibit the above mentioned repeating transverse gauge bands.

It is to be noted that such gauge bands are exhibited in single layer or homogeneous film, or sheet products, and are also exhibited in laminated film or sheet products, as illustrated in cross section in FIG. 2. That is to say, in FIG. 2, the extruded sheet 14 is composed of three layers 15, 16 and 17 which may be of diverse materials, as described in copending application Ser. No. 324,868 filed Nov. 19, 1963, mentioned above. However, such laminated products will also exhibit gauge band variations of the type shown in FIG. 1.

Such transverse gauge band variations are undesirable but are inherently produced in most presently known extrusion operations. They are undesirable since they tend to lead to splitting of the film during subsequent orientation steps in which the film is stretched to increase its strength and optical properties. Moreover, they cause an unnecessary waste of film material. Thus, in supplying a film to a consumer, it is often necessary thta the film thickness specified by the customer will be the minimum thickness at the trough of the gauge band variations. Therefore, the increased thickness portions represent an unnecessary expenditure of material to meet a particular specification. Clearly, by decreasing the average gauge band variation, a sheet coming within a particular thickness specification can be supplied where, however, the unnecessary surplus of material existent in thickened gauge band portions is removed from the product so that the product is less expensive to the producer.

Moreover, by eliminating high and low spots in the film, the average strength of the film is more constant over its length, so that splitting problems during orientation are substantially decreased, further improving the efficiency of the manufacturing process.

The problems discussed above are further aggravated when two sheets or films of the type shown in FIGS. 1 and 2 are laminated to one another in accordance with the lamination technique of above noted application Ser. No. 324,868.

Thus, as shown in FIG. 3, two sheets 20 and 21 having similar gauge band variations are normally laid directly atop one another with their transverse gauge bands in registry with one another. When these sheets are then compressed together in the laminating step, and as shown in FIG. 4, their regions of increased thickness add to one another to produce increased thickness portions 22 and decreased thickness portions 23. Thus, during the subsequent orientation step, there is a further likelihood of splitting the film with the subsequently oriented film having the same severe transverse gauge band variation.

In accordance with the present invention, a single sheet is extruded from an extruder with the width of the film having a common transverse gauge band character. Thereafter, the sheet is slit, and one-half is advanced or retarded with respect to the other sheet by an amount equal to some integral number times the distance between adjacent gauge bands plus approximately one-half the distance between gauge bands. Thereafter, these two sheets are then brought atop one another and compressed together so that their transverse gauge bands nest with respect to one another, as illustrated in FIG. 5.

Thus, in FIG. 5, sheet 30 and sheet 31 are the two halves of a common extruded sheet or film, and are retarded or advanced in position with respect to one another so that their increased thicknes portions 32 (for sheet 30) and 33 (for sheet 31) are displaced from one another and nest into the respective reduced thickness portions 34 for sheets 30 and 35 for sheet 31.

Thus, the average transverse gauge band variation for the laminated sheet will clearly be seen to be reduced from that shown in FIG. 4, whereupon the average gauge variation of the film is substantially reduced, and the tendency of the film to spilt during orientation is substantially reduced.

The manner in which the film or sheet sections shown in FIG. 5 can be typically be formed is illustrated in a schematic manner in FIGS. 6 and 7. Referring first to FIG. 6, I have schematically illustrated therein an extrusion system which includes a source of plastic material 40 which is connected to a suitable extruder 41 which extrudes a web 42 in the usual and well known manner. The web 42 is then moved over rollers 43 and 44 and through a slitting knife or suitable slitting means 45 which longitudinally slits the web 42 in its center to define two adjacent longitudinal film sections. Each of these sections are then passed over a common roller 46, and then to upper sheet section-displacing rollers 47 and 48.

As best shown in FIG. 7, the rollers 47 and 48 direct the sheet sections 42a and 42b in opposite directions, and over canted rollers 49 and 50, respectively, which direct the sheet sections 42a and 42b inwardly and toward an overlying relation with respect to one another. Thereafter, the sheet sections 42a and 42b are passed over a second pair of canted rollers 51 and 52, respectively, which alter the direction of movement of sheet sections 42a and 42b to directions parallel to one another after they are in overlying spatial relation.

The two sheet sections are then taken over rollers 53 and 54, respectively, 55 and 56, respectively, and the section 42a is then passed over rollers 56 and 57 toward a pair of pressure-applying nip rolls 58 and 59.

In order to retard the movement of sheet section 42b, this section moves from roller 56 to an adjustable roller 60 which is adjustable in a vertical direction so that the distance from roller 54 to roller 60 can be adjusted, thereby controllably advancing or retarding sheet section 42b with respect to section 42a. Thereafter, sheet section 42b passes over rollers 61 and 62 and into the nip rolls 58 and 59 where it is pressed into engagement with sheet section 42a with the adjustment of roller 60 causing the transverse gauge bands of the two sheet sections to nest with one another.

Thereafter, the sheet is passed over a suitable system of rollers including rollers 70, 71, 72 and 73 to a suitable tenter frame which will subsequently orient and further laminate the two sheets in the usual manner, and as is fully described in the above noted copending application Ser. No. 324,868.

Note that when the two film sections pass through the pressure-applying nip rolls 58 and 59 (or any other suitable means for bringing the two sheets together) they will be aligned, as illustrated in FIG. 5, to achieve the purposes of the invention.

If desired, and as further schematically illustrated in FIG. 6, some suitable heating means shown as triangular blocks 80 and 81 to schematically illustrate sources of hot air can be applied to the surfaces of webs 42a and 42b prior to their being pressed together to increase the adherence of the two film sections to one another.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

What is claimed is:

1. A laminated plastic sheet comprising a first and second layer of extruded plastic material; each layer having a first surface constituting an outer surface of said laminated sheet and an inner surface at the interface of said layers; each of said layers having parallel transverse gauge bands repeating in identical cyclic patterns; each of said transverse gauge bands comprising a section of increased thickness between sections of decreased thickness, each of said sections extending across the width of the layer perpendicular to the direction in which the layer was extruded; each of said first surfaces and said inner surfaces having undulations corresponding to the increased and decreased thicknesses of said layers; said transverse gauge bands of said first layer being displaced from the adjacent transverse gauge bands of said second layer whereby said gauge bands are nested with respect to one another thereby to decrease the magnitude of gauge bands thickness variation from the average gauge of said sheet.

References Cited

UNITED STATES PATENTS

| | | | |
|---|---|---|---|
| 2,128,390 | 8/1938 | Zerilli | 161—119 X |
| 2,306,587 | 12/1942 | Broderson | 161—116 X |
| 2,297,787 | 10/1942 | Locke | 161—120 X |
| 2,382,208 | 8/1945 | Corbin | 161—119 X |

ROBERT F. BURNETT, Primary Examiner

R. O. LINKER, JR., Assistant Examiner

U.S. Cl. X.R.

161—123